United States Patent [19]

Coutier

[11] Patent Number: 4,842,506
[45] Date of Patent: Jun. 27, 1989

[54] CLAMPING DEVICE FOR REMOVABLY SECURING SHAPING MOULDS ON THE PLATES OF MOULDING PRESSES

[76] Inventor: André Coutier, Le Pont d'Enfen, Champfromier, France, 01410

[21] Appl. No.: 172,417

[22] Filed: Mar. 23, 1988

[30] Foreign Application Priority Data

Mar. 26, 1987 [FR] France ................... 87 04441

[51] Int. Cl.⁴ .................................. B28B 17/00
[52] U.S. Cl. ........................ 425/193; 425/450.1; 425/451.9; 425/595; 425/DIG. 48; 425/DIG. 221
[58] Field of Search ............... 425/192, 595, DIG. 48, 425/193, DIG. 221, 589, 451.9, 592, 450.1; 249/167, 219.2

[56] References Cited

U.S. PATENT DOCUMENTS

| | | | |
|---|---|---|---|
| 1,894,511 | 1/1933 | Eppensteiner | 249/167 |
| 2,558,027 | 6/1951 | Wilson | 425/556 |
| 3,174,203 | 3/1965 | Kemper | 249/219.2 |
| 3,188,692 | 6/1965 | Traeger | 249/167 |
| 3,589,666 | 6/1971 | Kirby | 249/219.2 |
| 3,729,159 | 4/1973 | Foster | 248/205 R |
| 4,484,880 | 11/1984 | Schwarz | 425/192 R |
| 4,671,764 | 6/1987 | Hehe | 425/595 |
| 4,706,926 | 11/1987 | Von Holdt | 249/169 |

*Primary Examiner*—Jay H. Woo
*Assistant Examiner*—Khanh P. Nguyen
*Attorney, Agent, or Firm*—Dowell & Dowell

[57] ABSTRACT

A clamping device for removably securing shaping moulds on the plates of moulding presses, wherein a catch with projecting head is secured on the mould element, while the plate of the press is equipped with a slide element which slides obliquely under the effect of a lateral jack. The slide element has an opening in the form of a button-hole cut out therein, of which the part of larger diameter is traversed by the projecting head, while the part of smaller diameter allows passage only of the cylindrical shank of the catch.

3 Claims, 3 Drawing Sheets

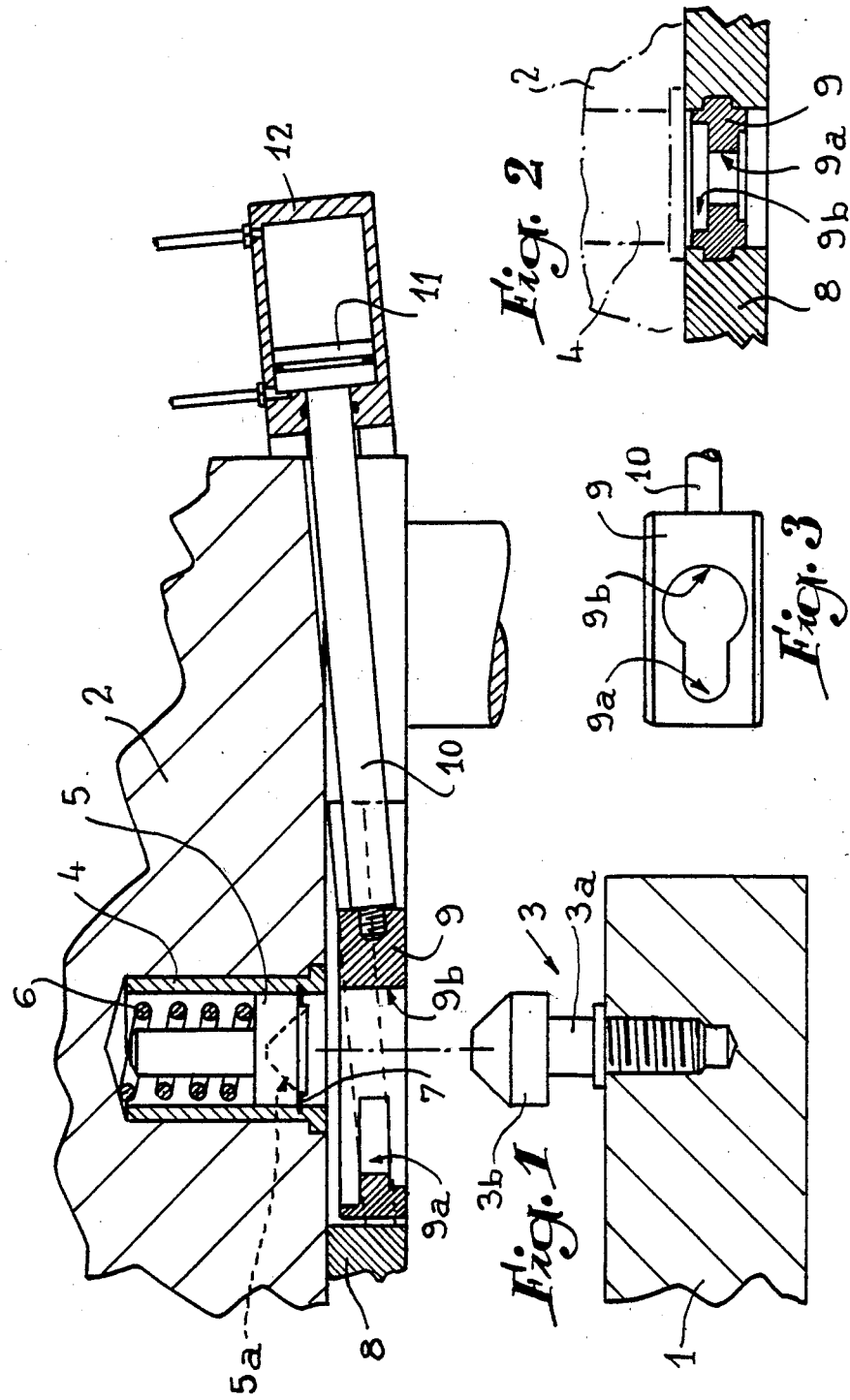

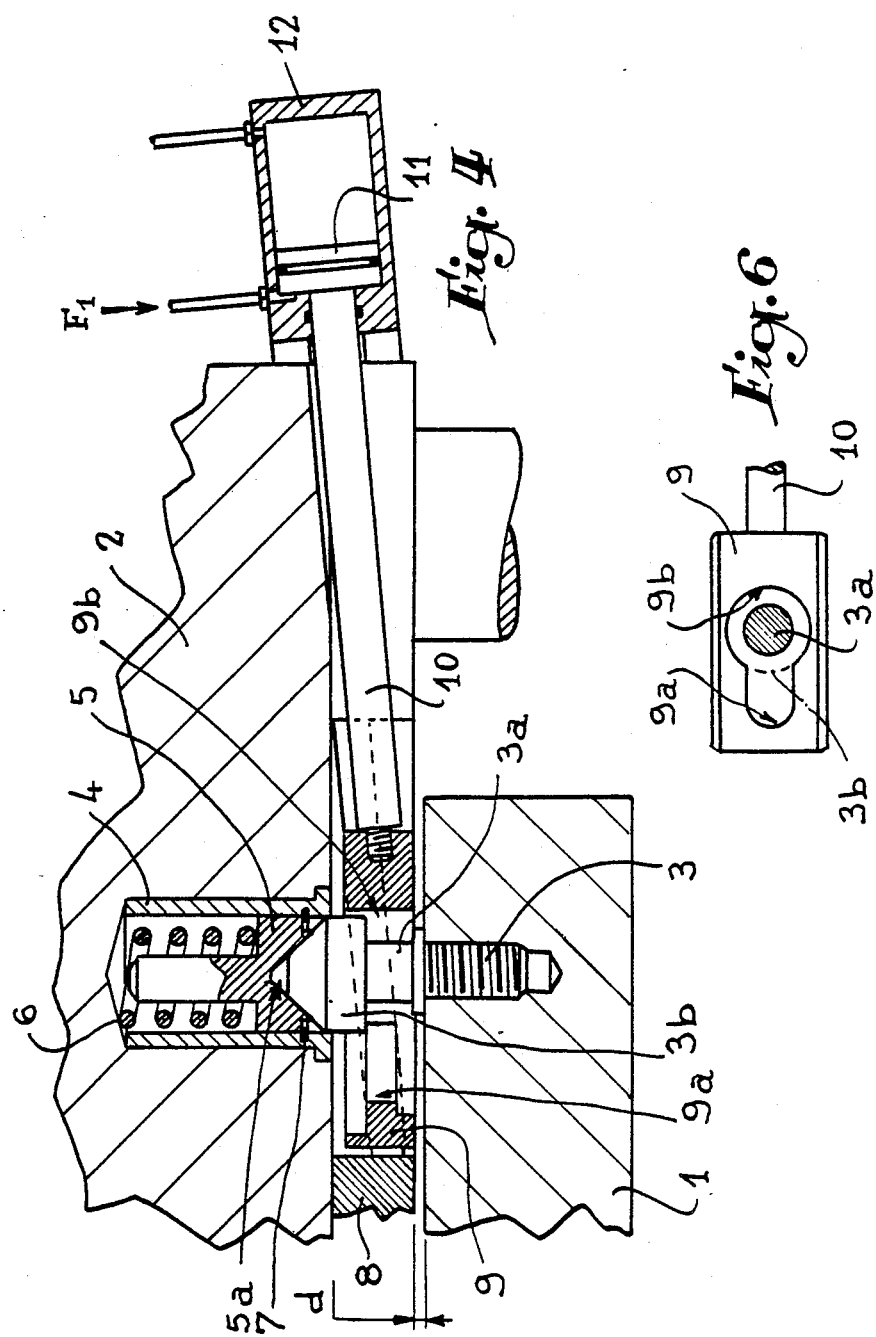

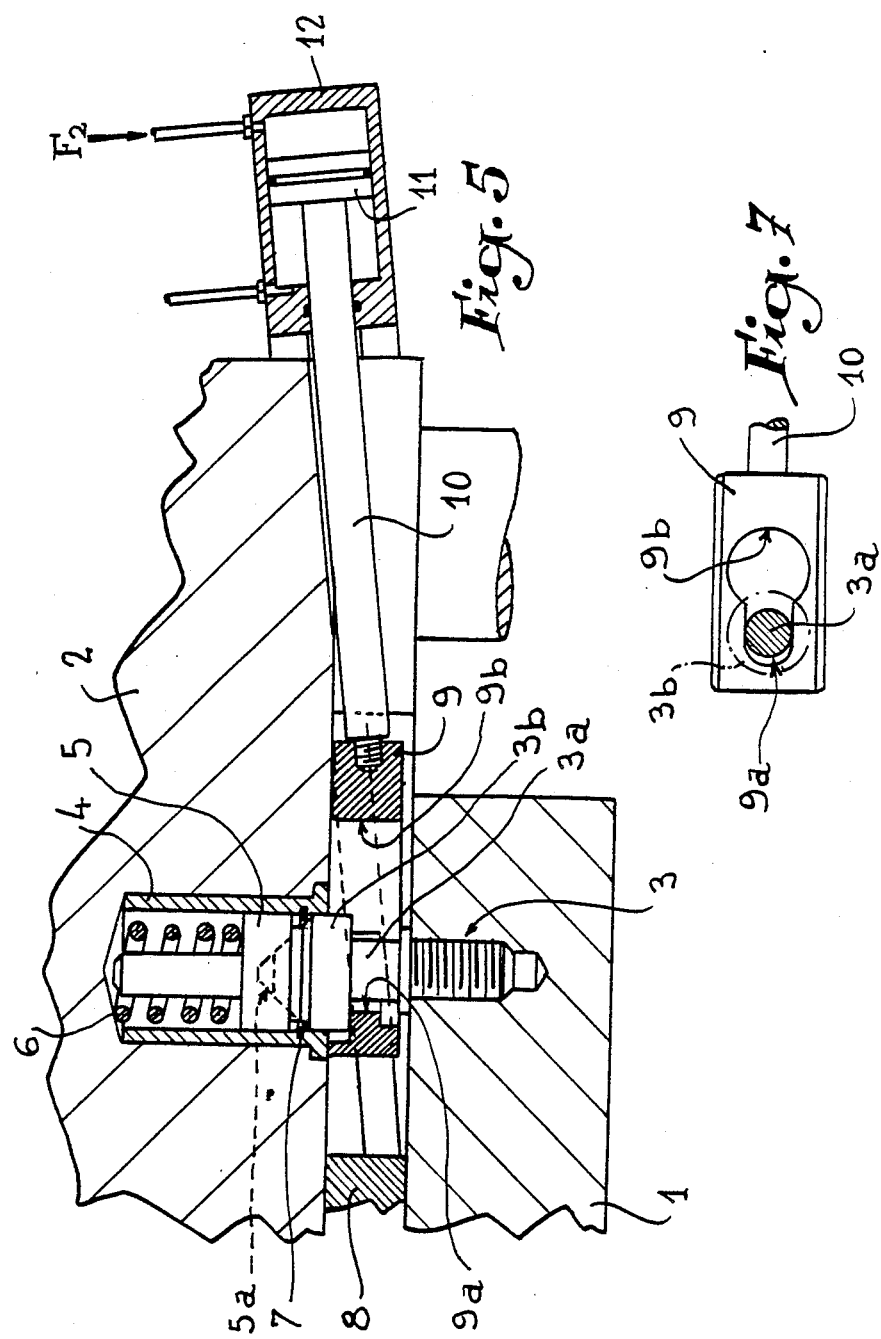

CLAMPING DEVICE FOR REMOVABLY SECURING SHAPING MOULDS ON THE PLATES OF MOULDING PRESSES

BACKGROUND OF THE INVENTION

1. Field of the Invention

The present invention relates to a clamping device for removably securing shaping moulds on the plates of moulding presses.

2. History of the Invention

In order to removably secure each of the two elements of a shaping mould on one or the other of the two plates of a conventional moulding press, it is known to employ clamping devices which must ensure perfectly efficient connection, while being easy and rapid to maneuver in order to facilitate replacement of one mould by another.

SUMMARY OF THE INVENTION

It is an object of the present invention to provide a clamping device actuated by compressed fluid which is adapted to respond particularly well to the requirements of the art.

The device according to the invention comprises a slide element which is guided along an oblique plane against the inner face of one of the plates of a press and which is actuated by a hydraulic jack of the double-effect type. This slide element has an opening with two diameters, in the form of a button-hole, cut out therein, adapted to cooperate with the projecting head and shank of a catch secured on the corresponding face of the element of the mould. At the level of this catch, the inner face of each plate has a housing hollowed out therein, inside which slides a pusher element associated with an elastic member which enables the pusher element to recoil during clamping of the pieces and, which also drives out the head of the catch during unlocking.

BRIEF DESCRIPTION OF THE DRAWINGS

The invention will be more readily understood on reading the following description with reference to the accompanying drawings, in which:

FIG. 1 is a vertical section showing in superposition, prior to assembly thereof, a press plate and a mould element equipped with a clamping device according to the invention.

FIG. 2 is a transverse section showing the guiding of the slide element of the device according to the invention.

FIG. 3 is a plan view of the slide element assumed to be in the dismantled state.

FIGS. 4 and 5 are longitudinal sections similar to that of FIG. 1, showing the parts of the device at two phases of the operating cycle.

FIGS. 6 and 7 are horizontal sections in detail illustrating the relative position of the slide element and of the catch at the phases corresponding to FIG. 4 and to FIG. 5.

DESCRIPTION OF THE PREFERRED EMBODIMENT

Referring now to the drawings, it has been assumed that the clamping device shown is used for securing a mould element 1 against the lower face of the upper plate 2 of any moulding press.

The device secured, a catch 3 screwed or otherwise fixed on the element 1 in order to project from the upper face of the element. It will be observed that this catch 3 comprises a cylindrical shank 3a provided with an upper head 3b of larger diameter.

Opposite each of the catches 3 provided on the element 1, the plate 2 comprises a cylindrical bushing 4 added in a vertical blind housing in the plate. In the inner housing defined by this bushing 4, there axially slides a pusher element 5 that a spring 6 tends to drive outwardly, the movement of the pusher element is limited by bearing against an annular ring 7 engaged in a groove in the bushing 4. It will be observed that the face of the pusher element 5 which faces downwardly, has an impression 5a of conical profile hollowed out therein, adapted to receive the upper part, itself of truncated section, of the projecting head 3b of the catch 3.

There is added against the lower face of the plate 2 a piece 8 (FIG. 2) which forms a slideway for guiding a slide element 9 with reciprocating movement. It will be noted that the longitudinal grooves of the piece or slideway 8 are oriented obliquely, with the result that the slide element 9, connected by an oblique rod 10 to piston 11 (FIG. 1) of a hydraulic jack 11-12 of the double-effect type, moves along a plane which is oriented obliquely with respect to the flat lower face of the plate 2. The cylinder 12 is of course rigidly fixed against the lateral wall of the plate 2.

As shown in detail in FIG. 3, the slide element 9 has a vertical opening, in the form of a button-hole, cut out therein, presenting a part 9a whose inner diameter corresponds, to within a slight clearance, to the diameter of the shank 3a of the catch 3, and a part 9b of larger diameter, adapted to be traversed by the projecting head 3b of the catch.

Operation of the clamping device described hereinabove follows from the foregoing explanations and will in any case be described with reference to FIGS. 4 to 7.

In FIG. 4, it has been assumed that, with a view to securing the element 1 of the mould against the plate 2 of the press, the element 1 has been positioned so that the catch 3 of each of the clamping devices is disposed in register with the corresponding bushing 4 of this 2. It will be readily appreciated that, by bringing the two pieces 2 and 1 together, the head 3b of each catch 3 is extended through the part 9b having the large diameter opening therein. The slide having been brought to in aligned position by the jack 11-12 being extended to the position shown in FIG. 4.

It will be noted that the conical impression 5a of the pusher elements 5 ensures, in connection with the upper part of the projecting head 3b of the catches 3, self-centering of the two pieces 1 and 2. It then suffices to admit the hydraulic fluid into the front chamber of the jack 11-12 (arrow F1 of FIG. 4). As shown in FIG. 5, recoil of the piston 11 provokes the oblique displacement of the slide element 9; the edges of the part 9a of smaller diameter abut against the annular lower face of the head 3b of each catch 3, consequently exerting a vertical effort which ensures clamping of the two pieces 1 and 2. A comparative examination of FIGS. 6 and 7 clearly shows that the cooperation of the slide element 9 and of the projecting head 3b of the catch 3 effects a perfectly efficient locking.

It should be observed that, due to the obliqueness of the grooves of the slideway 8 and to the forces of friction thus generated, a self-locking effect is obtained which ensures maintenance of the clamping, even if a breakdown occurred in the hydraulic circuit associated with the jack 11-12 during use of the press.

The clamping has of course provoked recoil of the pusher element 5 in the bushing 4, against the spring 6. To effect unlocking of the two pieces 1 and 2, it suffices to admit the fluid under pressure in the rear chamber of the jack 11-12 (arrow F2 of FIG. 5). Since, due to the presence of the rod 10 inside the opposite chamber, the unlocking effort is in any case greater than the clamping force previously developed, there cannot be any locking and the slide element 9 is returned to its position according to FIGS. 4 and 6. The spring 6 thereafter drives the pusher element 5 and the catch 3 downwardly, so that the element 1 is detached from the plate 2 by a distance d which facilitates removal thereof.

The whole manoeuvring does not require any manual mechanical intervention. The equipment to be provided on the moulds is inexpensive and comprises no hindrance since each mould element may project with respect to the corresponding plate.

However, it goes without saying that, in certain particular cases, the arrangement may be reversed, in that the catches 3 may be provided on each plate of the press, the slide elements 9 and the jacks 11-12 in that case being fixed on the mould elements.

It must, moreover, be understood that the foregoing description has been given only by way of example and that it in no way limits the domain of the invention which would not be exceeded by replacing the details of execution described by any other equivalents.

What is claimed is:

1. A clamping device for removably securing shaping moulds on the plates of moulding presses comprising the shaping mould having an upper surface, a catch secured to said upper surface of the shaping mould, said catch having a generally cylindrical shank and an outer head, said outer head having a greater width dimension than the diameter of said shank and a lower surface which is substantially parallel to said upper surface of the shaping mould, the plate of the moulding press having a lower surface, a bushing within the plate and being open at said lower surface, said bushing being in generally opposing relationship to said catch and being of a size to cooperatively receive said catch therein, a guide member secured to said plate and having grooves which are obliquely oriented with respect to said lower surface of the plate, a slide element mounted within said grooves of said guide member, said slide element having a button hole opening therein, said button hole opening having a first opening size of a large diameter to permit said outer head of said catch to pass therethrough and into said bushing when said slide element is in a first position with respect to the plate and having a second opening of a smaller size which is less than the width dimension of said outer head of said catch so that said shank of said catch extends therethrough and said slide element engages said lower surface of said head when said slide element is moved to a second position with respect to the plate, said second position being in closer proximity to the plate than said first position, and jack means for moving said slide element obliquely along said grooves of said guide member whereby when said slide element is moved to said second position, said catch is urged inwardly with respect to said bushing by said slide element to thereby securely lock the shaping mould into engagement with the plate.

2. The clamping device of claim 1 including a pusher element mounted within said bushing, said pusher element being in opposing relationship and engaging said outer head of said catch when said outer head is seated into said bushing, and resilient means within said bushing for urging said pusher element toward said catch so as to separate said shaping mould from the plate when said slide element is in said first position.

3. The clamping device of claim 2 wherein said outer head of said catch is substantially conical in configuration and said pusher element includes a lower face having a substantially conical depression therein for cooperatively receiving said outer head of said catch to thereby cooperatively align the moulding press with respect to the plate.

* * * * *